(12) United States Patent
Dattagupta

(10) Patent No.: US 8,917,651 B2
(45) Date of Patent: Dec. 23, 2014

(54) ASSOCIATING WI-FI STATIONS WITH AN ACCESS POINT IN A MULTI-ACCESS POINT INFRASTRUCTURE NETWORK

(75) Inventor: Siddhartha Dattagupta, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 13/253,901

(22) Filed: Oct. 5, 2011

(65) Prior Publication Data

US 2013/0089001 A1      Apr. 11, 2013

(51) Int. Cl.
| | | |
|---|---|---|
| *H04J 1/00* | (2006.01) | |
| *H04J 3/08* | (2006.01) | |
| *H04W 48/20* | (2009.01) | |
| *H04W 12/06* | (2009.01) | |
| *H04W 48/08* | (2009.01) | |

(52) U.S. Cl.
CPC .............. *H04W 48/20* (2013.01); *H04W 12/06* (2013.01); *H04W 48/08* (2013.01)
USPC ............................ 370/315; 370/255; 709/227

(58) Field of Classification Search
USPC .................................... 709/227; 370/315, 255
See application file for complete search history.

(56) References Cited

U.S. PATENT DOCUMENTS

| | | | | |
|---|---|---|---|---|
| 2008/0195736 | A1* | 8/2008 | Sekiya ........................... | 709/227 |
| 2008/0240068 | A1* | 10/2008 | Ishimoto ....................... | 370/345 |
| 2010/0313241 | A1* | 12/2010 | Lee et al. ...................... | 726/3 |
| 2011/0058536 | A1 | 3/2011 | Tsuchiya et al. | |
| 2011/0164520 | A1* | 7/2011 | Kostic et al. .................. | 370/252 |
| 2011/0268027 | A1* | 11/2011 | Nogawa ........................ | 370/328 |
| 2012/0044522 | A1* | 2/2012 | Park et al. .................... | 358/1.15 |

FOREIGN PATENT DOCUMENTS

| | | |
|---|---|---|
| EP | 2112844 A2 | 10/2009 |
| EP | 2160059 A2 | 3/2010 |

OTHER PUBLICATIONS

International Search Report for application PCT/US2012/059056 dated Feb. 1, 2013.
"Wi-Fi Protected Setup Specification Version 1.0h", Dec. 31, 2006, pp. 1-110, XP055031152, retrieved from the Internet: http://gp;.back2roots.org/source/puma5/netgear/CG3200-1TDNDS_GPL/ap/apps/wpa2/origingal/Wi-Fi Protected Setup Specification 1.0h.pdf.

* cited by examiner

*Primary Examiner* — Kenny Lin

(74) *Attorney, Agent, or Firm* — Patterson + Sheridan, LLP

(57) ABSTRACT

A wireless network client may be configured to use push button configuration (PBC) techniques to associate with wireless networks that include multiple access points. When the configuration buttons on a smart network host device, such as a wireless network host device, and an enrolling client device are pressed, one of the access points is selected to perform the push button configuration process with the client device. The selected access point then enters a PBC mode, allowing the client and selected access point to perform the authentication and configuration exchange.

21 Claims, 10 Drawing Sheets

ASSOCIATING WI-FI STATIONS WITH AN ACCESS POINT IN A MULTI-ACCESS POINT INFRASTRUCTURE NETWORK

TECHNICAL FIELD

Embodiments presented in this disclosure generally relate to computer networking. More specifically, embodiments presented herein relate to a technique for using a push button configuration mechanism to associate a wi-fi station with an access point in a multi-access point infrastructure network.

BACKGROUND

Wireless networks have become commonplace. For example, many people use a wireless access point within their home to provide an internet connection to multiple TCP/IP enabled devices. Similarly, wireless networks are used in enterprise environments to provide connectivity for a variety of computing devices. A wireless access point typically operates using a version of the IEEE 802.11 wireless local area network standards (i.e., currently, the 802.11a, b, g or n standards), and desktop PCs, laptop PCs, mobile telephones, telephones, tablet PCs, net-books, video game consoles, among other devices, can connect to a wireless network operating according to these standards.

As these networking environments have grown, both in size and complexity, it is not uncommon for a wireless network infrastructure to include multiple access points. Doing so may extend both the range and capacity of a wireless network. For example, within an enterprise, multiple access points may be used to create a single, logical network. In such an environment, when a user roams outside the range of one access point, another access point takes over.

To join a wireless network, a host station first needs to authenticate itself to the network. For example, a wireless network may comply with established security standards such as WPA (Wi-fi Protected Access) or its predecessor WEP (wired equivalent privacy). In such cases, a device may authenticate itself to the wireless network by providing a password or key along with a service set identifier (SSID). In an environment with multiple access points, the SSID (and associated passwords) may be shared across the access points. Typically, a user (e.g., a network administrator in an enterprise environment) configures the network access points to share the SSID and sets the access password or key. The wireless network can also be configured to restrict access on a host-by-host basis, e.g., by specifying the MAC addresses of authorized hosts, as well as restrict access in terms of times-of-day, applications, or ports.

BRIEF DESCRIPTION OF THE DRAWINGS

So that the manner in which the features the embodiments presented herein can be understood in detail, a more particular description may be had by reference to example embodiments, some of which are illustrated in the appended drawings. It is to be noted, however, that the appended drawings illustrate only example embodiments and are therefore not to be considered limiting of its scope.

DESCRIPTION

Overview

Figure 1A:
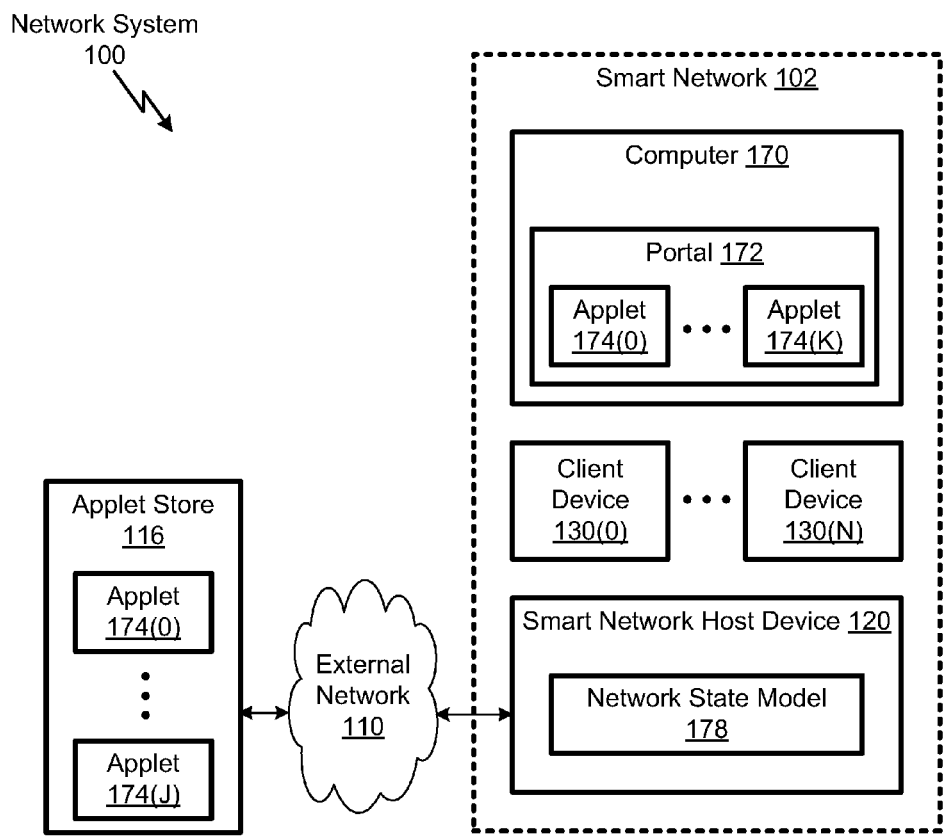
FIG. 1A is an exemplary illustration of a network system configured to implement one or more aspects of embodiments presented in this disclosure.

Embodiments presented herein allow client devices to use push button configuration (PBC) techniques to associate with wireless networks that include multiple access points. One embodiment includes a computer-implemented method, which includes receiving, in response to a push button configuration (PBC) button being pushed on a wireless network client device, a request to enroll the wireless network client device in a wireless network which includes a plurality of access points. This method may also include receiving, from one or more of the access points, a message indicating the availability of the respective access point to perform a PBC process with the wireless network client device. This method may also include selecting one of the plurality of access points to perform the PBC process with the wireless network client device and sending a message to the selected access point indicating to perform the PBC process with the wireless network client device.

In a particular embodiment, the method also includes prior to selecting one of the plurality of access points to perform the PBC process with the wireless network client device, receiving an indication of a PBC button being pressed on the registrar. Additionally, while a variety of criteria may be used, the access point may be selected based on networking capabilities supported by the network client device, a reported signal strength between each respective access point and the wireless network client device, and on a count of wireless client devices assigned to each respective access point. Further, the PBC process itself may include receiving device configuration data from the wireless network client device, sending network configuration data to the wireless network client device and storing the device configuration data from the wireless network client device. Once enrolled, the wireless network client device is allowed to subsequently join the wireless network without repeating the PBC process.

Description of Example Embodiments

A wireless network may be configured to allow only authenticated devices to join the network. However, configuring and securing a wireless network can be cumbersome.

Further, wireless networks are often administered by people with little expertise in networking or network security. Consequently, many wireless networks are operated with little or no security features enabled. To address this, Wi-fi Protected Setup (WPS) has been developed as an open standard to provide an easy, reliable approach for configuring a secure wireless network.

Among other things, the WPS standard provides a mechanism and protocol specifications for PBC for consumer equipment vendors to use, if they chose to do so. The WPS standard describes behavior of access points which support a push button configuration (PBC) mechanism. PBC allows a user to associate a client device with a wireless network by simply pushing a button, either an actual button or a virtual one, on both the access point and the wireless client device. Once the button on the client is pressed, the client begins broadcasting a message requesting to enroll in any PBC-capable wireless networks within range. Similarly, once the button on the access point (or a registrar) is pressed, the access point begins advertising messages indicating that client devices may enroll with that access point. Note, the order in which the buttons are pressed does not matter, but once the button is pushed on the access point, the user then has a limited window (120 seconds in WPS) in which to push the button on the wireless client device to associate it with the wireless network.

Provided the respective buttons are pressed within the window, the access point enrolls the client device as an authenticated device within that wireless network. Thereafter, the client device may join the wireless network without needing to press the configuration buttons again. That is, the push button configuration process occurs once and the network will subsequently recognize the client device as being authorized to join the wireless network. Additionally, encryption keys may be generated and exchanged to secure wireless communications between the device and the access point each time the device joins the network.

While the PBC mechanism included in the WPS standard functions as intended, the PBC process may fail to associate a new client device in wireless network environments that include multiple access points. In such an environment, one of the access points (or network management software) may be designated as a registrar, or wireless LAN manager, for the wireless network and the access points. When a user presses the configuration button on the client device, the registrar tells the access points using the same SSID to begin advertising to accept PBC enrollees for configuration. However, if the client device is within range of multiple access points (in particular, two or more access points using the same radio band) then the client device may receive multiple such advertisements. When this occurs, the WPS standard calls for the client device to enter a "session overlap" state and to decline to associate itself with the wireless network. More specifically, according to the WPS standard, if a client device sees multiple access points in PBC mode within 200 seconds of the configuration button being pressed on the client device, then a session overlap is signaled and the client device backs off from association. Note, one single infrastructure network shares the same network credentials across the access points. Hence, wifi protected setup with one access point authenticated by the WLAN Manager registrar will allow the client device to roam from one access point to the other within the same infrastructure network without requiring another setup procedure.

More generally, wifi protected setup using a push button configuration (or similar techniques) has an inherent issue of mis-configured devices or phishing attacks. This is especially because there is no pre-shared secret to authenticate the client to the registrar (and vice versa) as it is possible in the case of WPS with PIN method or near field communication methods. Hence, the session overlap was introduced to reduce the probability of mis-configurations. Since this creates a problem for multi-access point networks, a solution has been proposed for co-located access points in two different radio bands in the WPS specification by using the same UUID, but this does not solve the problem of the infrastructure network with multi-access points distributed over the network and using the same radio bands.

Given these issues embodiments presented herein provide a "smart" registrar which decides which access point is to be chosen. This method maintains the basic tenets of avoidance of mis-configured devices without breaking the WPS specification and also provides a smart network association model. That is, embodiments presented herein allow client devices to use PBC techniques to associate with wireless networks that include multiple access points. Thus, embodiments presented herein allow client devices implementing the WPS standard to use push button configuration to associate with an access point in networking environments that include multiple access points. The access points may all share the same SSID, as well as use the same radio band frequency, e.g., a 2.4 Ghz or 5.0 GHz radio band.

In one embodiment, when the configuration button for the registrar is pressed, the registrar selects one of the access points to perform the push button configuration process with the client device. The selected access point then enters a PBC mode, allowing the client and selected access point to perform the authentication and configuration exchange. The registrar may select the access point using a variety of criteria. For example, the registrar may select the access point receiving the strongest radio signal from the client device. Other approaches are discussed below. Alternatively, the client device could make the decision as well. In such a case, the same UUID could be used for all the access points inside the infrastructure networks and the same smart network policy based decisions could be taken by the client device rather than the registrar.

Note, the following description uses the push button configuration features of the Wi-fi Protected Setup standard as an example of PBC based association and authentication for network infrastructures that include multiple access points. However, one of ordinary skill in the art will recognize that embodiments presented in this disclosure can be generally applicable and extensible to other wireless networking protocols or network infrastructures which support push button configuration features. That is, the techniques presented herein may be adapted for use with other wifi protected setup processes where an enrollee is authenticated and enrolled without any knowledge of any pre-shared secret.

An Exemplary Wireless Networking Environment

FIG. 1A illustration of an overarching network system 100 configured to implement one or more aspects of embodiments presented in this disclosure. The network system 100 comprises a smart network 102, an external network 110 and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service, and file (or block device) service. New devices register with the smart network host device 120, which then updates the network state model 178 to include the new device.

A portal application 172, residing within the computer 170, is configured to access the network state model 178 to determine which client devices 130 are available within the smart network 102, which services the client devices 130 provide, and to access and use the services. The portal application 172 may include one or more applets 174, configured to extend functionality of the portal application 172. A given applet 174 may be associated with a specific client device 130 and may facilitate specific usage models for the client device 130 via the extended functionality. When a new client device 130 registers with the smart network 102, a most recent version of a corresponding applet 174 may not be available within the portal application 172. However, the portal application 172 may retrieve the corresponding applet 174 or version of the corresponding applet 174 from the applet store 116.

The applet store 116 is configured to facilitate access to applets 174 by the portal application 172. The applet store 116 provides storage for applets 174 corresponding to client devices 130 and makes the applets 174 available for download to the portal application 172 via the external network 110. In one embodiment, the applet store 116 occupies a well-known location, such as a universal resource locator (URL) associated with the external network 110. Any technically feasible technique may be used to identify a particular applet 174 as corresponding to a particular client device 130. Furthermore, any technically feasible technique may be used to download the particular applet 174 an incorporate the functionality of the applet 174 to the portal 172.

Figure 1B:
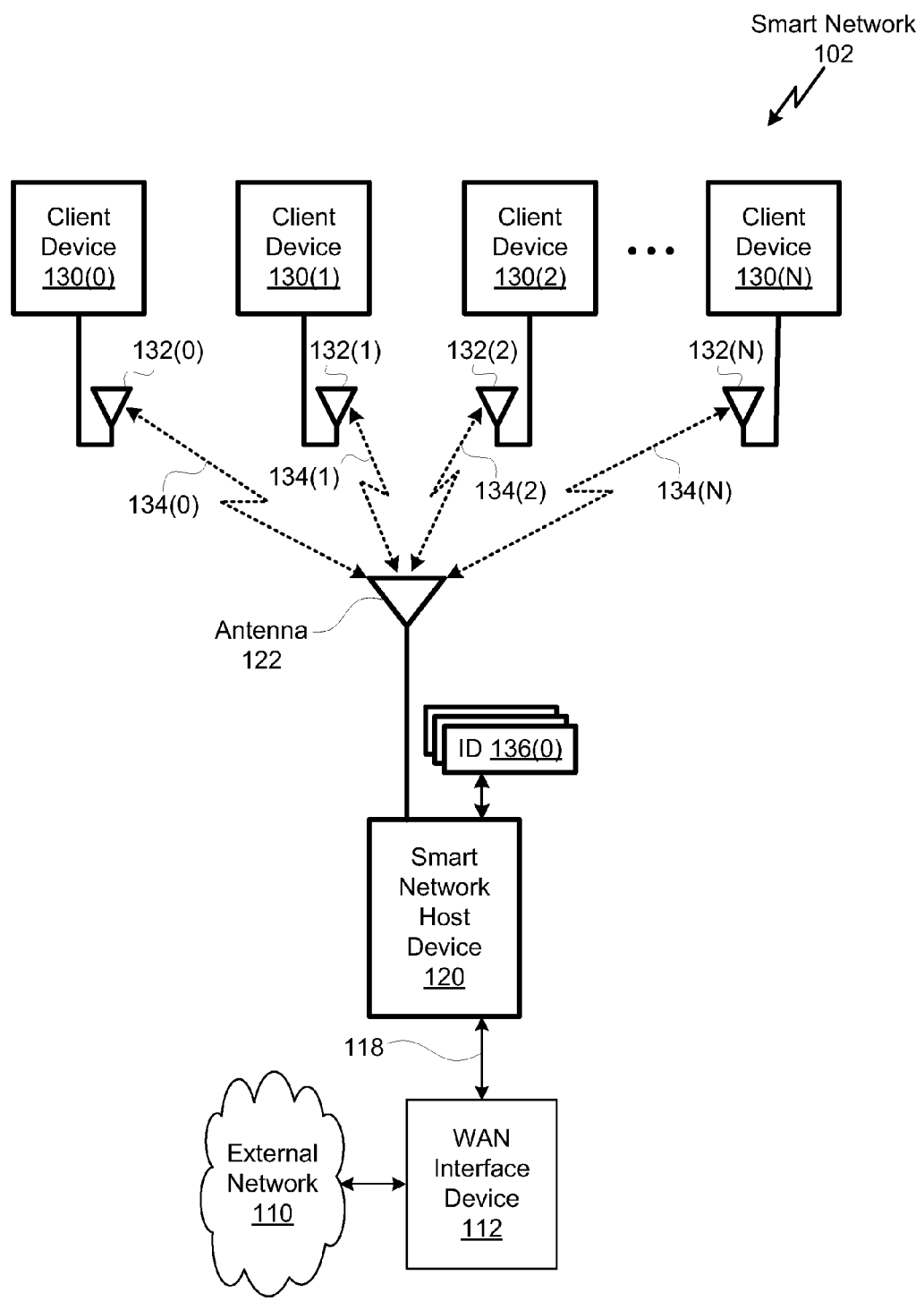
FIG. 1B illustrates the smart network of FIG. 1A, according to one example embodiment presented in this disclosure.

FIG. 1B illustrates the smart network 102 of FIG. 1A, according to one example embodiment presented in this disclosure. As shown, the smart network 102 comprises a smart network host device 120, one or more client devices 130 and a wide area network (WAN) interface device 112, coupled to the external network 110 of FIG. 1A. The WAN interface device 112 may implement a cable modem, digital subscriber line (DSL) modem, fiber to the home interface, or any other technically feasible device that provides digital network connectivity to the external network 110. The WAN interface device 112 is coupled to the smart network host device 120 via a network interface 118. In one embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured establish wireless client links 134 to antennas 132 coupled to corresponding client devices 130. The smart network host device 120 implements layer 2 forwarding for wireless data packets forwarded among client devices 130 as well as internet protocol (IP) layer 3 routing between an IP domain associated with the smart network 102 and the external network 110. In this configuration, the smart network host device 120 provides related services and protocols, such as dynamic host configuration protocol (DHCP), network address translation (NAT), and the like.

The smart network host device 120 acts as a central authentication authority for the smart network 102 and implements authentication services for devices registering with the smart network 102. In one embodiment, authentication is implemented via Identification (ID) devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one embodiment, the ID devices 136 are implemented as near field radio frequency identification (RFID) tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing the scope and spirit of the embodiments presented herein. For example, in another embodiment, the ID devices 136 could be implemented as a physical token that includes a printed bar code on a face of the token. The bar code may encode authentication credentials for a corresponding client device 130. In such an embodiment, the smart network host device 120 may include an optical scanner capable of reading the printed bar code from the physical token. In alternative embodiments, other forms of ID devices 136 may implement storage of the authentication credentials. For example, a universal serial bus (USB) storage device may be used to present authentication credentials to the smart network host device 120 for authenticating a related device, such as the computer 170. In other alternative embodiments, a user may manually authenticate a client device 130 with the smart network host device 120. For example, the user may log onto a management web page generated by the smart network host device 120 and manually enter authentication credentials, such as a printed code associated with the client device 130.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is the able to read the ID device 136 and authenticate the printer. The printer registers with the smart network host device 120 and is then available for use by devices connected within the smart network 102. Upon successfully reading the ID device 136, the smart network host device 120 may indicate success to the user by flashing a light-emitting diode (LED), or by generating any technically feasible indication.

Figure 1C:
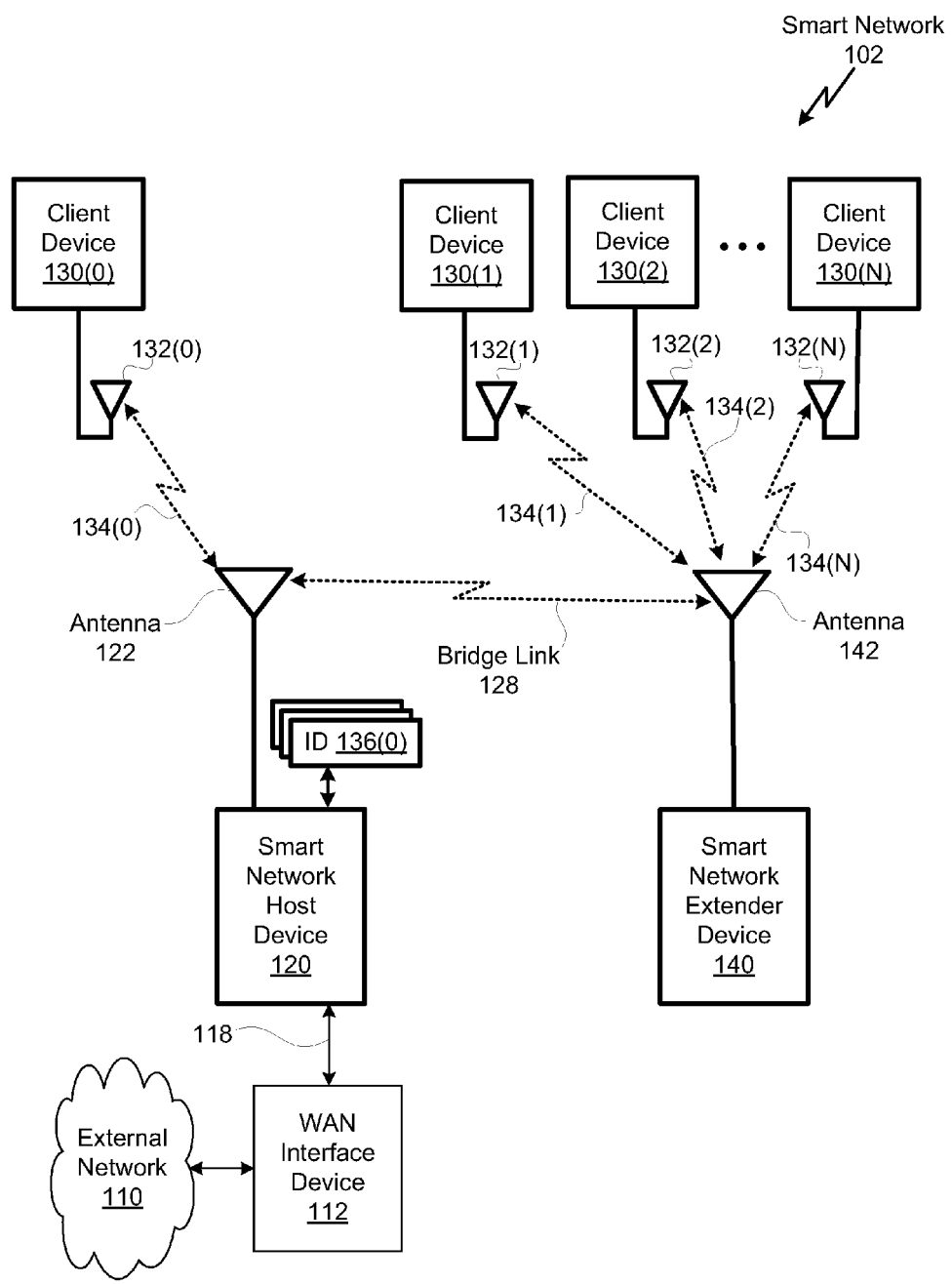
FIG. 1C illustrates the smart network of FIG. 1A, according to another example embodiment presented in this disclosure.

FIG. 1C illustrates the smart network of FIG. 1A, according to another example embodiment presented in this disclosure. Here, the smart network 102 comprises a smart network host device 120, a smart network extender device 140, one or more client devices 130 and a wide area network (WAN) interface device 112, coupled to the external network 110 of FIG. 1A. The WAN interface device 112, smart network host device 120 and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one embodiment, each smart network extender device 140 is paired to an ID device 136, which is presented as an authentication credential to the smart network host device 120 to enable the smart network extender device 140 to participate within the smart network 102.

Figure 1D:
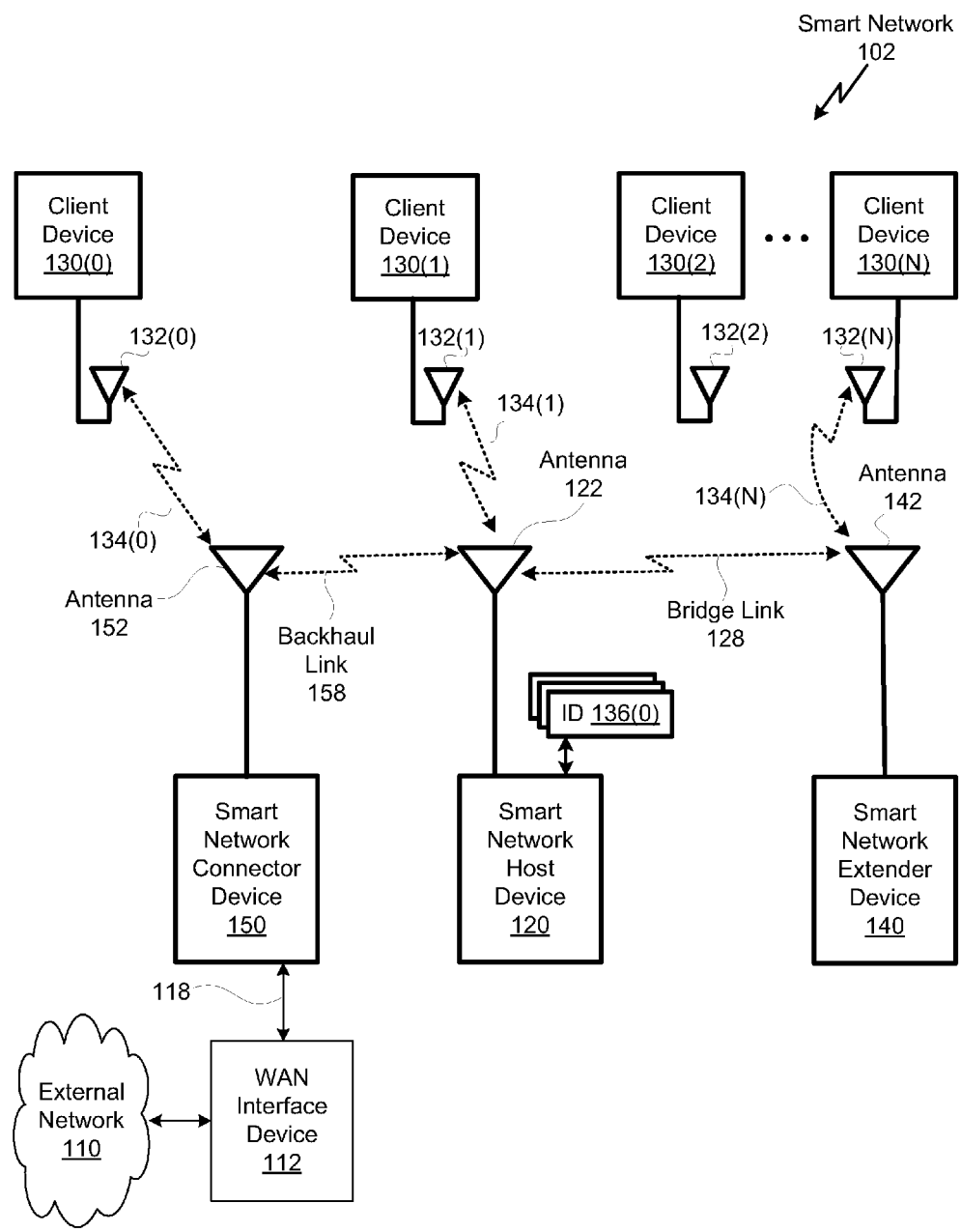
FIG. 1D illustrates the smart network of FIG. 1A, according to yet another example embodiment presented in this disclosure.

FIG. 1D illustrates the smart network of FIG. 1A, according to yet another example embodiment presented in this disclosure. Here, the smart network 102 comprises a smart network host device 120, a smart network extender device 140, one or more client devices 130, a smart network connector device 150 and a wide area network (WAN) interface device 112, coupled to the external network 110 of FIG. 1A. The WAN interface device 112, smart network extender device 140 and one or more client devices 130 are configured to operate as previously described in FIGS. 1B and 1C.

In this embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150.

Network data traffic between client device 130(N) and the external network 110 traverses wireless client link 134(N), bridge link 128 and backhaul link 158. This network data traffic is also forwarded by smart network extender device 140, smart network host device 120 and smart network connector device 150. A client device 130 may connect directly to any one of the network extender device 140, smart network host device 120 or smart network connector device 150. As shown, client device 130(0) is connected to smart network connector device 150 via wireless client link 134(0), client device 130(1) is connected to smart network host device 120 via wireless client link 134(1), and client device 130(N) is connected to smart network extender device 140 via wireless client link 134(N).

In one embodiment, the smart network connector device 150 is paired to an ID device 136, which is presented as an authentication credential to the smart network host device 120 to enable the smart network connector device 150 to participate within the smart network 102. In an alternative embodiment, the smart network connector device 150 and the smart network host device 120 are paired during a manufacturing step, eliminating the need for a separate ID device 136.

Figure 1E:
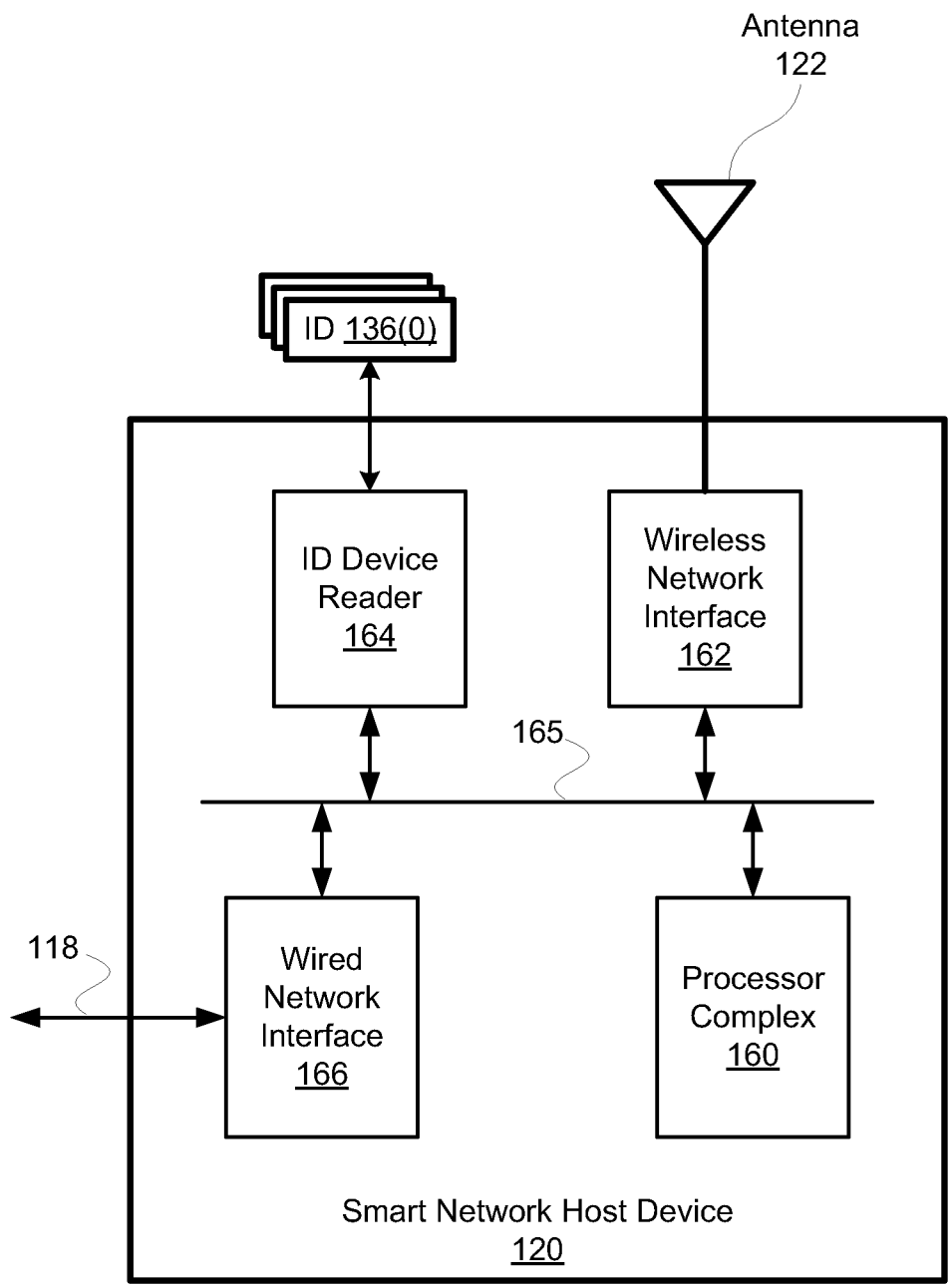
FIG. 1E is a more detailed illustration of the smart network host device of FIG. 1A, according to one example embodiment presented in this disclosure.

FIG. 1E is a more detailed illustration of the smart network host device of FIG. 1A, according to one example embodiment presented in this disclosure. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory (RAM) for storing temporary or volatile data, and an interface to the interconnect 165. In one embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one embodiment, the ID device reader 164 is configured to read data from RFID tags comprising the ID device 136. The ID device reader 164 may also include a USB reader. In another embodiment, the ID device reader 164 may be implemented as an optical scanner for reading ID devices 136 that encode data via a printed bar code. In yet other embodiments, the ID device reader 164 may be configured to read data from other types of interfaces, such as other types of flash memories like an SD flash card.

In certain embodiments, the smart network host device 120 comprises one or more integrated circuits that implement respective functions of the smart network host device 120. For example, the processor complex 160, wired network interface 166 and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
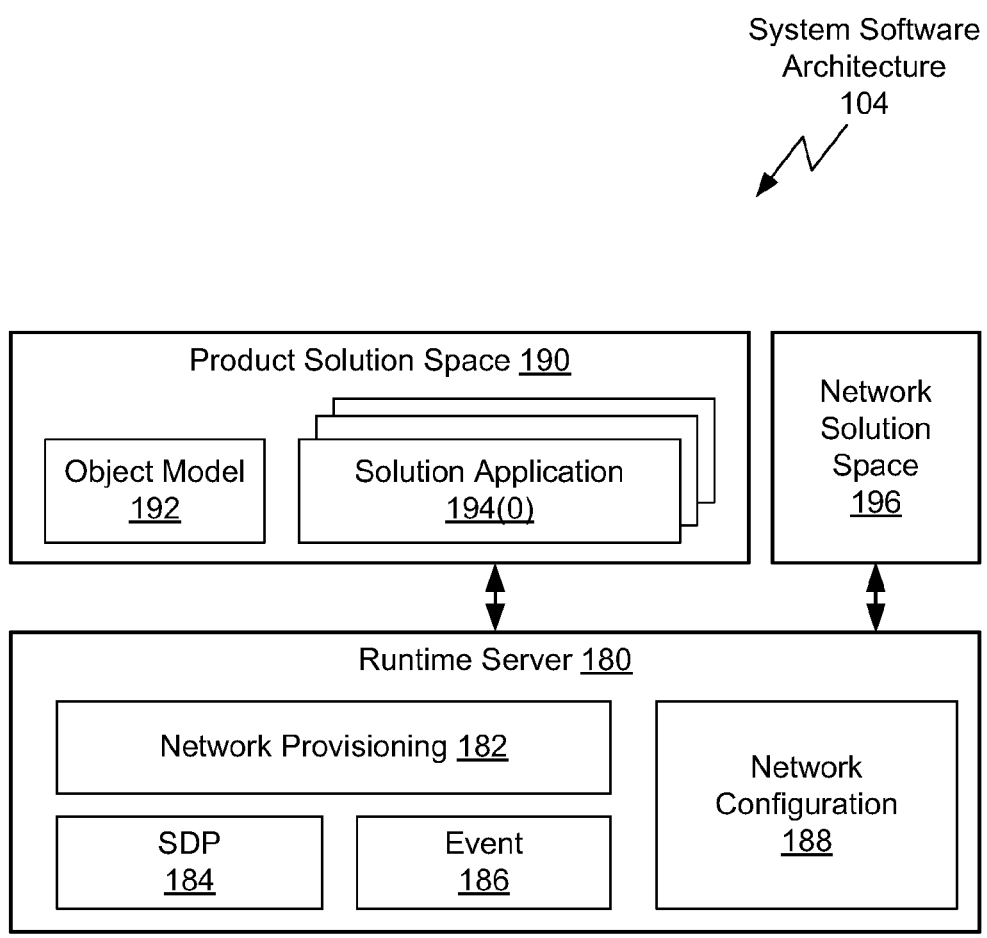
FIG. 1F illustrates a system software architecture for the smart network host device of FIG. 1E, according to one example embodiment presented in this disclosure.

FIG. 1F illustrates a system software architecture for the smart network host device of FIG. 1E, according to one example embodiment presented in this disclosure. As shown, the software architecture 104 includes several software modules within the smart network host device 120. Programming instructions stored within the processor complex 160 implement a portion of the system software architecture 104 that includes a runtime server 180, a product solution space 190 and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras and display devices. Exemplary services include device and service discovery, event tracking and generation, and state presentation for the different elements. In one embodiment, the object model 192 includes a network interface based on the well-known extensible markup language (XML). One or more solution applications 194 provide specific functionality, such as a specific view of a storage system, or a specific technique for presenting certain data. The network solution space 196 includes software modules configured to provide management of network elements and network services, including device services, local area network services within the smart network 102 and wide area network services related to connectivity management of the external network 110.

The runtime server 180 comprises a network provisioning module 182, a service and discovery provisioning (SDP) module 184, an event module 186 and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

Push Button Device Configuration for Multiple Access Points

In addition to the device configuration and authentication techniques using RFID tags, bar codes, and USB connections as set forth above, in one embodiment, the smart network host device 120 may also be configured to support a push button configuration mechanism. In such embodiments, the smart host device 120 may include a physical (or virtual) button which, when pressed, activates a push button configuration process, allowing client devices 130 with PBC capabilities to enroll as an authenticated host in the smart network 102. FIGS. 2-5 illustrate an example of such an embodiment of the smart network 102.

Figure 2:
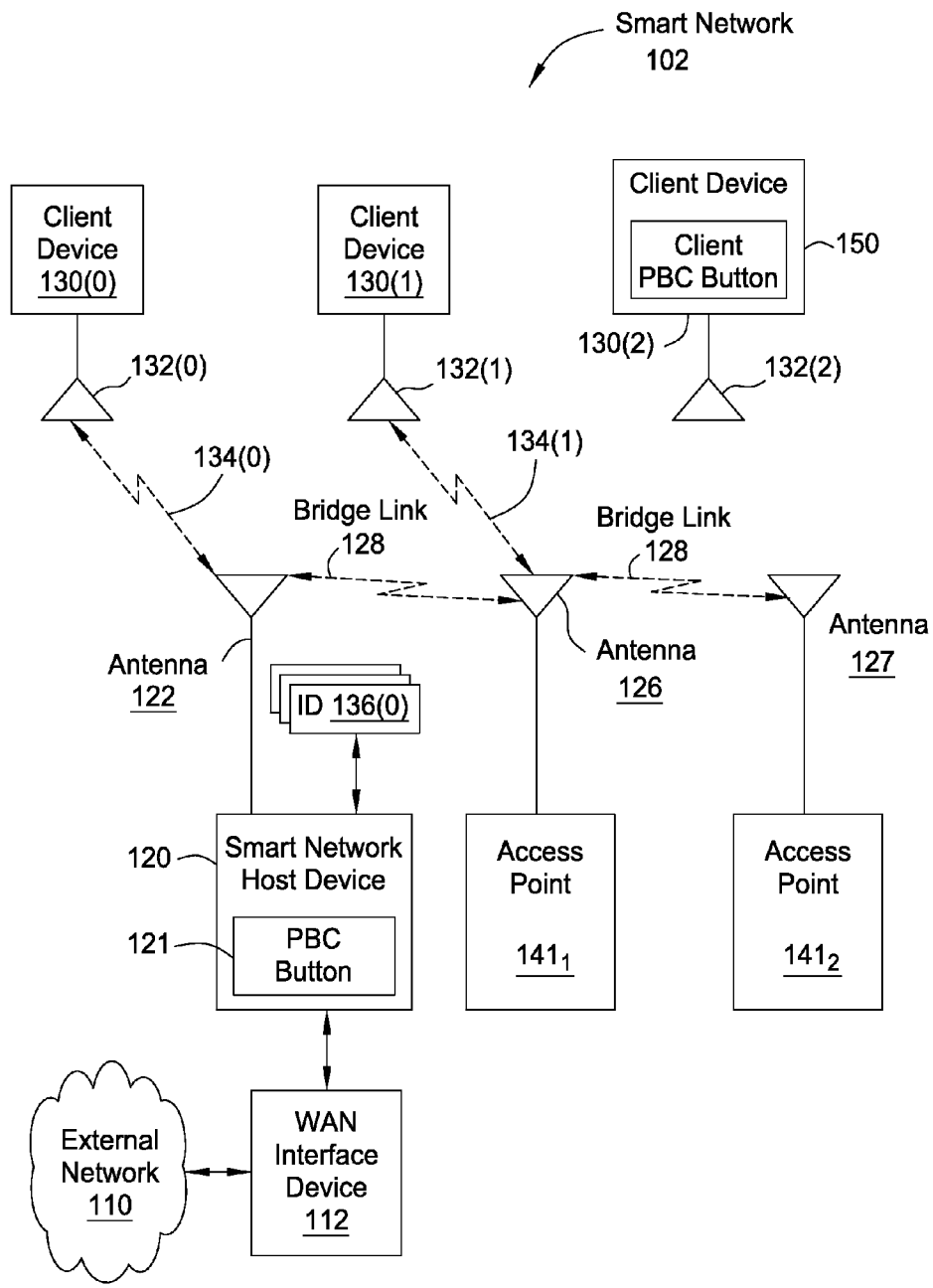
FIG. 2 illustrates the smart network of FIG. 1A, according to another example embodiment presented in this disclosure.

First, FIG. 2 illustrates the smart network of FIG. 1A, according to another example embodiment presented in this disclosure. Here, the smart network 102 includes the smart network host device 120, access points $141_{1-2}$, one or more client devices 130 and a wide area network (WAN) interface device 112, coupled to the external network 110 of FIG. 1A. The WAN interface device 112, smart network host device 120 and client devices 130(0) and 130(1) are configured to operate as previously described in FIG. 1A-1E.

Access points $141_{1-2}$ each allow authenticated clients (e.g., client devices 130(0) and 130(1)) to access the smart network 102 over wireless client links 134. As shown, access points $141_{1-2}$ each include an antenna 126, 127 used to transmit and receive radio transmissions of network frames from client devices 130 and smart network host device 120. In this example, the access points $141_{1-2}$ have each established a bridge link 128 with the smart network host device 120. Network data transmitted by one of the client devices 130 destined for the external network 110 is received by one of the access points $140_{1-2}$ and retransmitted via bridge links 128 to the smart network host device 120. The smart network host device 120 then forwards the network data to the external network 110. Similarly, data packets from the external network 110 with a destination address of one of the client devices 130 are transmitted via bridge link 128 to the appropriate access point $141_{1-2}$, which retransmits the data packets via one of the wireless client links 134 to the appropriate client device 130

In one embodiment, when a client device 130 is powered on (or initially comes within range of the smart network 102), the access point $141_{1-2}$ which first sees the client device 130, communicates with the smart network host device 120 to determine whether the client device 130 is authorized to access the smart network 102. That is, the smart network device acts as a registrar or wireless lan (WLAN) manager. If the device is authorized, then the access point 141 allows that client device 130 to join the smart network 102 and may begin forwarding network frames to from the client device 130. For example, as shown in FIG. 2, client device 130(1) has joined the smart network 102 via wireless client link 134(1). Similarly, if the first device to detect a client device attempting to join smart network 102 is the smart network host device 120, then the smart network host device 120 determines whether the client device 130 is authorized to access the smart network 102. If so, then the client joins the network and sends/receives network frames from the smart network host device 120. For example, as shown in FIG. 2, client device 130(0) has joined the smart network 102 via wireless link 134(0).

In addition to previously described functionality, the smart network host device 120 may be configured to support a push button configuration process to authorize and configure new client devices 130 being added to the smart network 102. In such a case, to authorize and configure a new client device 130, a user presses a button on the client device 130 and the smart network host device 120 (or on one of the access points $141_{1-2}$). For example, as shown in FIG. 2, the smart network host device 120 includes a push button configuration (PBC) button 121 and client device 130(2) includes a corresponding client PBC button 150. In order to enroll client device 130(2), a user simply presses the PBC button 121 and client PBC button 150 within a specified time window (e.g., within 120 seconds). Once the buttons have been pressed, the smart network host device 120 may select one of the access points 141 (or itself) to perform the enrollment process to authorize and configure the client device 130. That is, the selected access point 141 (or device 120) enrolls the client device 130 as one that is authorized to join and access the smart network 102. Once authorized, client device 130(2) establishes a wireless link with one of the access points 141 (or smart network host device 120) and may then begin sending and receiving network frames.

Figure 3:
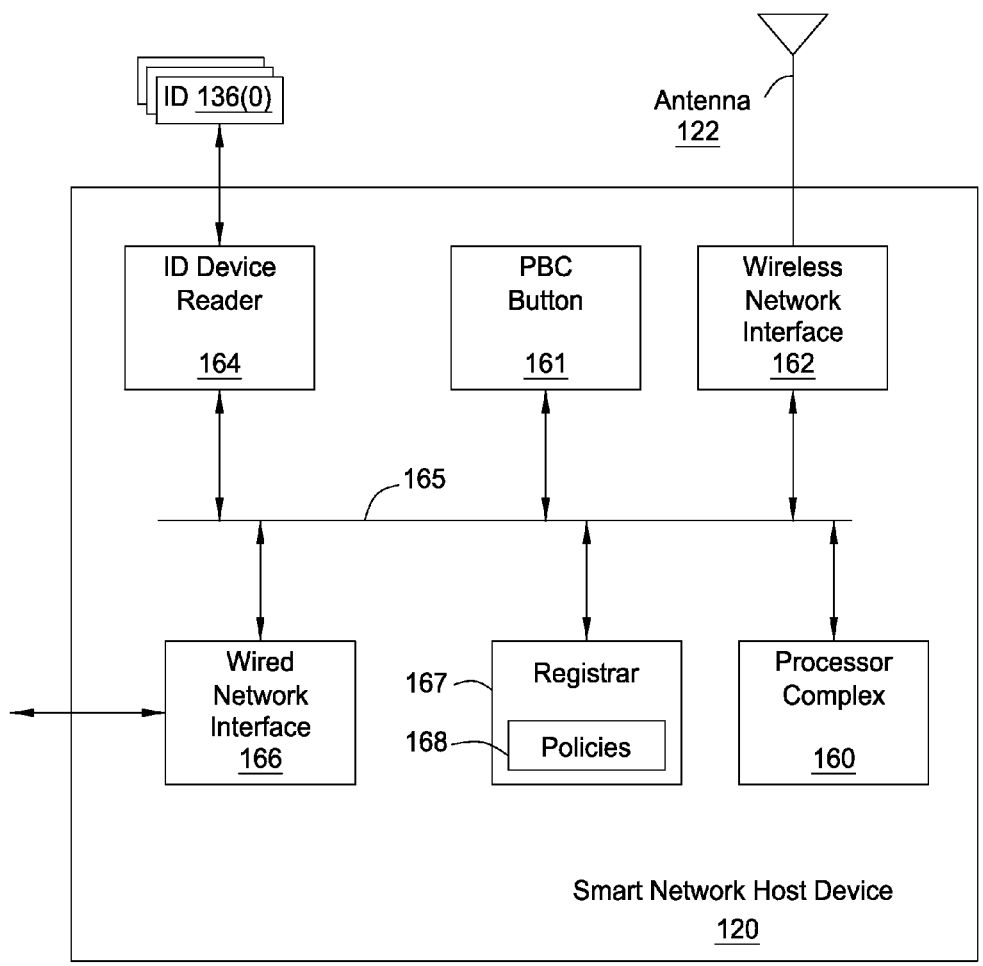
FIG. 3 illustrates an example of the smart network host device of FIG. 1E configured to support push button configuration, according to one embodiment presented in this disclosure

FIG. 3 illustrates an example of the smart network host device 120 of FIG. 1E configured to support push button configuration, according to one embodiment presented in this disclosure. Here, the smart network host device 120 includes the ID device reader 164, wired and wireless network interfaces 162 and 166, and interconnect 165 are configured to operate as previously described in FIG. 1A-1F. In addition to previously described functionality for these components, the smart network host device 120 also includes a PBC button 121 and a registrar component 167.

In one embodiment, the PBC button 121 is a physical component of the smart network host device 120. In such a case, the user presses the PBC button 121 to initiate the PBC configuration process, i.e., the user presses the PBC button 121 to enroll new client devices 130 in the smart network 102. While not required, the smart network host device could present an indication that it has entered a push button configuration mode. For example, an LED could be configured to flash for one hundred and twenty seconds following the point in time where the user pushes the PBC button 121.

The smart network host device 120 could also include a graphical configuration and management interface. For example, the smart network host device 120 could include an embedded HTTP server and store a collection of web pages (and logic used to generate web pages) used to present the configuration and management interface to users. In such a case, a user may use a web browser on computer 170 to navigate to the management interface and click a button displayed to initiate the push button configuration mode. Further, as the user has a limited time to press the client PBC button 150 on a client device 130 to be enrolled, the interface could display a countdown timer showing how much time the smart network host device 120 will remain in the push button configuration mode.

Once a user presses the PBC buttons on both the smart network host device 120 and a client device 130, the registrar component 167 may be configured to enroll that client device in the network. Alternatively, in a network environment which includes the smart network host device 120 and additional access points 141, the registrar component 167 may be configured to select which access point (or itself) to enroll a new client device 130 in the smart network 102. In such a case, only the device selected by the registrar 167 to enroll the new client device 130 communicates with that client device 130. Doing so may avoid the new client device 130 from entering a session overlap mode, potentially preventing the device from joining the smart network 102 if multiple access points are PBC enabled at the same time.

In one embodiment, the registrar 167 may select which device should perform the push button configuration enrollment process with the new client device 130 based on polices 168, characteristics of the new client device, characteristics of the access points (or smart network host device 120), the then prevailing network conditions, and network load of the smart network 102, or any combinations of these factors. More generally, the policy 168 for selecting an access point 141 to enroll a new client device 130 may depend on any appropriate business logic or other criteria needed to suit the needs of a particular case.

For example, the registrar 167 may assess a reported signal strength between the new client device 130 and each access point 141 that receives the PBC enrollment request from the new client device 130 (after the client PBC button 150 is pressed) and have the access point with the strongest reported signal strength complete the enrollment process. Other approaches could be based on a device profile and the services requested by the client device 130. That is, a network infrastructure may be configured with multiple access points 141 used to provide different networking services. For example, a networking infrastructure could include one access point 141 used to provide VoIP services to telephone stations, while another access point 141 could be dedicated for use by streaming media devices, and another access point 141 could be configured for general email, web, and other traffic. Another approach for the registrar 167 to select an access point 141 could be based on the number of stations already associated to the access points in the smart network 102. That is, the registrar 167 may load-balance clients among multiple access points 141.

Still another approach includes selecting an access point 141 based on capabilities of the client device 130, e.g., based on whether the antenna on the new client device 130 supports 2 spatial streams or 3 spatial streams. In such case, the registrar 167 may preferentially assign a client device 130 which supports only 2 spatial streams to an access point 141 already assigned similar devices. Doing so may help preserve the networking performance of an access point 141 servicing client devices which support 3 (or more) spatial streams, as mixing 2- and 3 spatial stream devices will frequently constrain the performance of an access point to the 2 spatial stream capacity. Similarly, the access point 141 could be selected based on what networking protocols are supported by the client device. For example, a slower client device 130 (e.g., one limited to the 802.11a or 802.11b networking protocols) could be preferentially assigned away from an access point 141 already associated with faster client devices (e.g., ones capable of using the 802.11g or 802.11n networking protocols) in cases where doing so would degrade the performance for the faster or more capable devices. Of course, one of ordinary skill in the art will recognize that these examples as well as a variety of other criteria could be used by the registrar 167 to select an access point to enroll a new client device 130 and subsequently manage network traffic for that client device 130.

Figure 4:
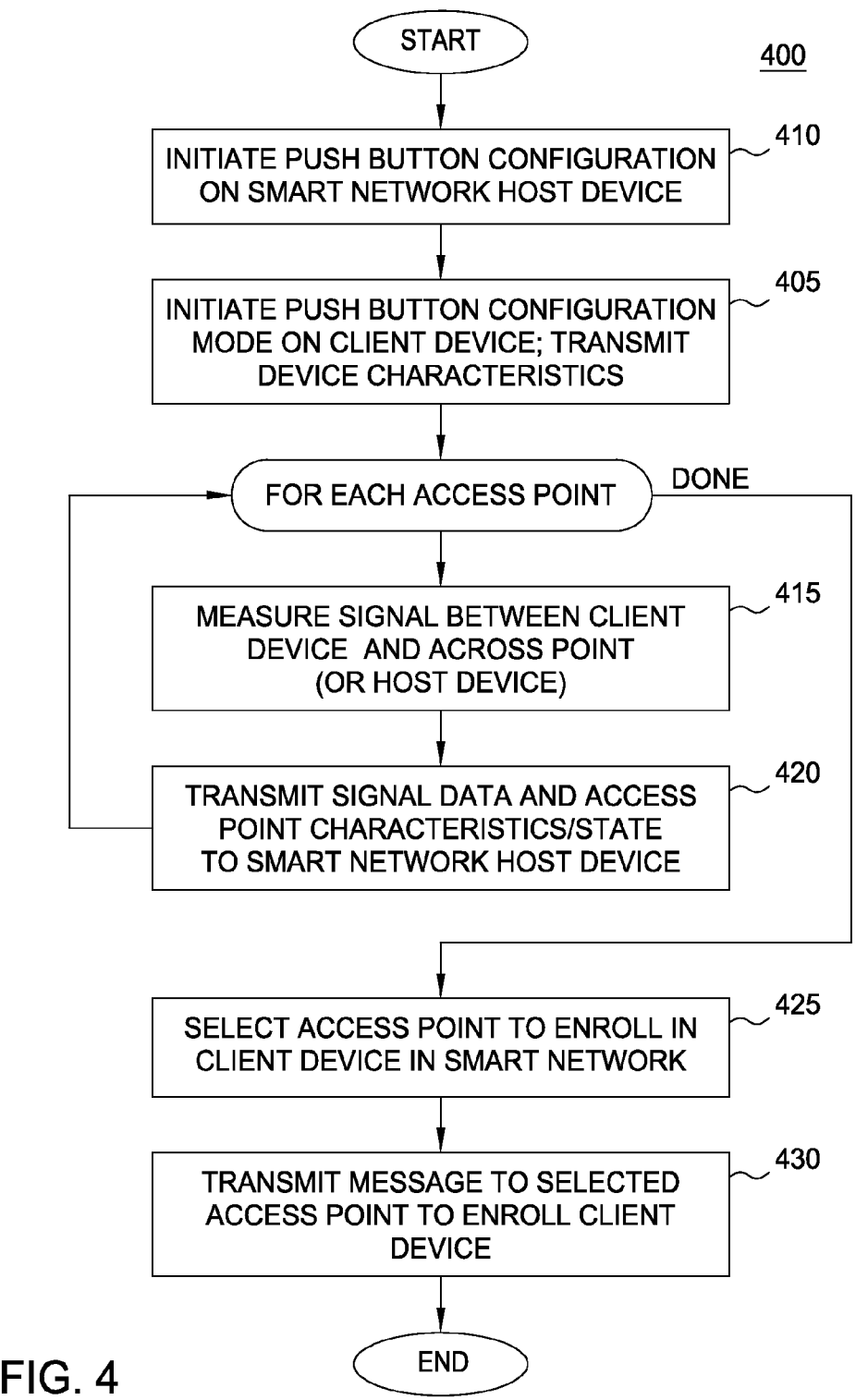
FIG. 4 illustrates a method for the smart network host device to select an access point to enroll a client device using push button configuration, according to an example embodiment presented in this disclosure.

FIG. 4 illustrates a method 400 for the smart network host device to select an access point to enroll a client device using push button configuration, according to an example embodiment presented in this disclosure. As shown, the method 400 begins at step 405, where a user initiates a push button configuration (PBC) process on a smart network host device. As noted, the button may be a physical button on the smart network host device or a graphical interface button presented on a display screen.

At step 410, the user initiates a push button configuration mode on a client device the user wishes to associate with the wireless network managed by the smart network host device. Like the PBC button on the smart network host device, the button may be a physical button or one presented on a graphical interface. Once pressed, the client device may begin broadcasting a request message for a response from an access point that can be used to complete the PBC process and enroll the client device into a wireless network. The request message may also transmit device characteristics of the client device (e.g., what protocols are supported, what physical hardware is included on the client device, what network services are being requested, etc.). Note, steps 405 and 410 may be performed in either order.

Once the PBC buttons on both the client device and the smart network host device have been pressed, the smart network host device waits to receive a message from each access point that could be selected to enroll the client device. First, at step 415, an access point that received the request message broadcast by the client device measures the strength of the radio signal between itself and the client device. And at step 420, the access point transmits a message to the smart network host device. For example, the access point may inform the smart network host device and/or the registrar that it received the broadcast message from the client device and could be selected to complete the PBC process and enroll the client device. Further, the message could also indicate characteristics of the access point (to the extent not already known to the smart network host device. For example, the access point could inform the smart network host device of the current number of clients associated with that access point.

Note, steps 415 and 420 may be repeated for each access point that receives the broadcast message from the client device being enrolled in the smart network. Similarly, the smart network host device measures the strength of the signal between itself and the client device being enrolled.

At step 425, the smart network host device selects an access point to enroll the new client device in the smart network. As noted above, the smart network host device may rely on a variety of criteria to select which access point complete the PBC process and enroll the client device into the wireless network managed by the smart network host device. At step 430, the smart network host device transmits a message to the selected access point to enroll the client device.

Figure 5:
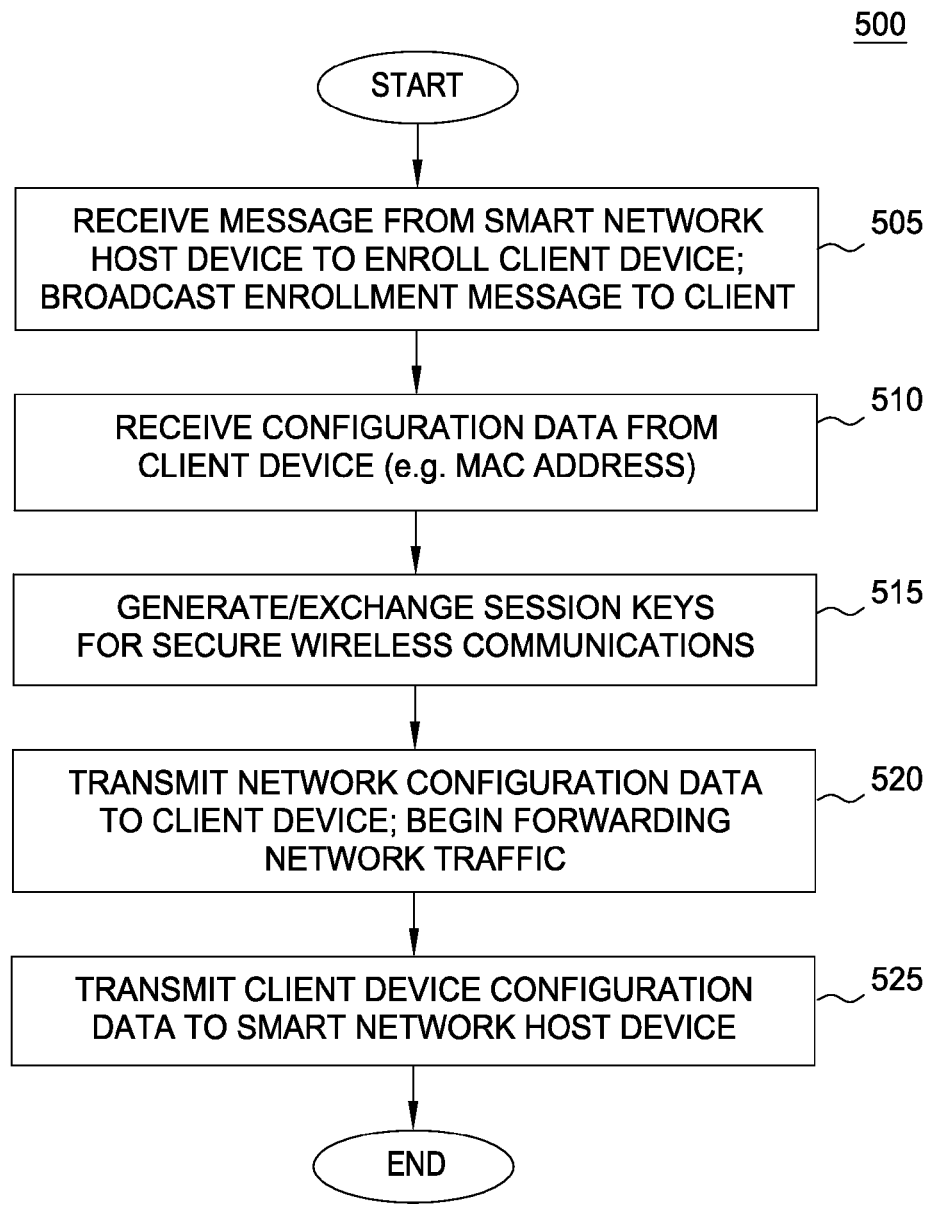
FIG. 5 illustrates a method for an access point to enroll a client device in a smart network, according to an example embodiment presented in this disclosure.

FIG. 5 illustrates a method 500 for an access point to enroll a client device in a smart network, according to an example embodiment presented in this disclosure. As shown, the method 500 begins at step 505 where an access point receives a message from the smart network host device to enroll the client device. In response, the access point broadcasts a push button configuration message to the client device indicating that the access point is going to complete the push button configuration and enrollment of that client device. At step 510, the access point receives configuration data from the client device necessary to enroll it in the smart network. For example, the client device may supply a MAC address, a device type, as well as provide the access point with device characteristics capabilities and supported protocols.

At step 515, the access point and client device may generate and exchange session keys used to secure wireless communications between the client and the wireless device. At step 520, the access point transmits network configuration data to the client device. For example, the access point may transmit an IP address (in cases where the client device (or smart network host device) acts as a DHCP server) along with network access policies, gateway addresses, name server addresses, etc. Once transmitted, the client device may configure itself and begin forwarding traffic to the access point. At step 525, access point may share any relevant configuration data revived from the client device with the smart network host device. For example, the smart network host device may receive the MAC address along with other data used by the client device to authenticate itself to the smart home network for future networking sessions. That is, the push button configuration process needs to occur only once for a given client device, and thereafter, the smart network host device should recognized the enrolled client device as being authorized to join the smart home network.

As described, embodiments presented herein allow client devices to use push button configuration techniques to associate with wireless networks that include multiple access points. When the configuration buttons on a smart network host device and an enrolling client device are pressed, one of the access points is selected to perform the push button configuration process with the client device. The selected access point then enters a PBC mode, allowing the client and selected access point to perform the authentication and configuration exchange. The registrar may select the access point using a variety of criteria. Thus, embodiments presented herein allow client devices implementing the wi-fi protected setup standard to use push button configuration to associate with an access point in networking environments that include multiple access points, without resulting in a client device entering a session overlap mode.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:
1. A computer-implemented method, comprising:
receiving, in response to a push button configuration (PBC) button being pushed on a wireless network client device and from the wireless network client device, a request to connect to a wireless network which includes a plurality of access points, wherein the request further specifies one or more network services that include at least one of a plurality of network traffic types to be transmitted over the wireless network connection, and wherein each of the plurality of access points is pre-configured to provide a respective at least one network service of a plurality of network services;
receiving, from one or more of the access points, a message indicating the availability of the respective access point to perform a PBC process with the wireless network client device supporting the specified one or more network services;
selecting one of the plurality of access points to perform the PBC process with the wireless network client device, based on the requested one or more network services and the at least one network service that the selected access point is pre-configured to provide; and
sending a message to the selected access point indicating to perform the PBC process with the wireless network client device.
2. The method of claim 1, further comprising:
prior to selecting one of the plurality of access points to perform the PBC process with the wireless network client device, receiving an indication of a PBC button being pressed on one of the access points.

3. The method of claim 2, wherein the PBC buttons on each of the wireless network client device and the access point are pushed within a specified amount of time, relative to one another.

4. The method of claim 1, wherein the access point is selected further based on a first determination of whether the wireless network client device supports a first type of spatial stream and a second determination of whether the selected access point supports the first type of spatial stream.

5. The method of claim 1, wherein the access point is selected further based on a reported signal strength between each respective access point and the wireless network client device, and wherein both the requested one or more services and the at least one service provided by the selected access point include at least one of VOIP, streaming media, general e-mail, and web services.

6. The method of claim 1, wherein the access point is selected, at least in part, based on a count of wireless client devices assigned to each respective access point.

7. The method of claim 1, wherein the selected access point is configured to perform the PBC process by:
   receiving device configuration data from the wireless network client device;
   sending network configuration data to the wireless network client device; and
   storing the device configuration data from the wireless network client device, wherein the client device is allowed to subsequently join the wireless network without repeating the PBC process.

8. A non-transitory computer-readable storage medium storing code for execution by a processor, wherein the code, when executed by the processor, performs an operation, comprising:
   receiving, in response to a push button configuration (PBC) button being pushed on a wireless network client device and from the wireless network client device, a request to connect to a wireless network which includes a plurality of access points, wherein the request further specifies one or more network services that include at least one of a plurality of network traffic types to be transmitted over the wireless network connection, and wherein each of the plurality of access points is pre-configured to provide a respective at least one network service of a plurality of network services;
   receiving, from one or more of the access points, a message indicating the availability of the respective access point to perform a PBC process with the wireless network client device supporting the specified one or more network services;
   selecting one of the plurality of access points to perform the PBC process with the wireless network client device, based on the requested one or more network services and the at least one network service that the selected access point is pre-configured to provide; and
   sending a message to the selected access point indicating to perform the PBC process with the wireless network client device.

9. The computer-readable storage medium of claim 8, wherein the operation further comprises:
   prior to selecting one of the plurality of access points to perform the PBC process with the wireless network client device, receiving an indication of a PBC button being pressed on one of the access points.

10. The computer-readable storage medium of claim 9, wherein the PBC buttons on each of the wireless network client device and the access point are pushed within a specified amount of time, relative to one another.

11. The computer-readable storage medium of claim 8, wherein the access point is selected further based on a first determination of whether the wireless network client device supports a first type of spatial stream and a second determination of whether the selected access point supports the first type of spatial stream.

12. The computer-readable storage medium of claim 8, wherein the access point is selected further based on a reported signal strength between each respective access point and the wireless network client device, and wherein both the requested one or more services and the at least one service provided by the selected access point include at least one of VOIP, streaming media, general e-mail, and web services.

13. The computer-readable storage medium of claim 8, wherein the access point is selected, at least in part, based on a count of wireless client devices assigned to each respective access point.

14. The computer-readable storage medium of claim 8, wherein the selected access point is configured to perform the PBC process by:
   receiving device configuration data from the wireless network client device;
   sending network configuration data to the wireless network client device; and
   storing the device configuration data from the wireless network client device, wherein the client device is allowed to subsequently join the wireless network without repeating the PBC process.

15. A wireless access point, comprising:
   a processor; and
   a memory storing management firmware which, when executed on the processor, performs an operation, comprising:
      receiving, in response to a push button configuration (PBC) button being pushed on a wireless network client device and from the wireless network client device, a request to connect to a wireless network which includes a plurality of access points, wherein the request further specifies one or more network services that include at least one of a plurality of network traffic types to be transmitted over the wireless network connection, and wherein each of the plurality of access points is pre-configured to provide a respective at least one network service of a plurality of network services;
      receiving, from one or more of the access points, a message indicating the availability of the respective access point to perform a PBC process with the wireless network client device supporting the specified one or more network services;
      selecting one of the plurality of access points to perform the PBC process with the wireless network client device, based on the requested one or more network services and the at least one network service that the selected access point is pre-configured to provide; and
      sending a message to the selected access point indicating to perform the PBC process with the wireless network client device.

16. The wireless access point of claim 15, further comprising:
   prior to selecting one of the plurality of access points to perform the PBC process with the wireless network client device, receiving an indication of a PBC button being pressed on one of the access points.

17. The wireless access point of claim 16, wherein the PBC buttons on each of the wireless network client device and the access point are pushed within a specified amount of time, relative to one another.

18. The wireless access point of claim 15, wherein the access point is selected further based on a first determination of whether the wireless network client device supports a first type of spatial stream and a second determination of whether the selected access point supports the first type of spatial stream.

19. The wireless access point of claim 15, wherein the access point is selected further based on a reported signal strength between each respective access point and the wireless network client device, and wherein both the requested one or more services and the at least one service provided by the selected access point include at least one of VOIP, streaming media, general e-mail, and web services.

20. The wireless access point of claim 15, wherein the access point is selected, at least in part, based on a count of wireless client devices assigned to each respective access point.

21. The wireless access point of claim 15, wherein the selected access point is configured to perform the PBC process by:
  receiving device configuration data from the wireless network client device;
  sending network configuration data to the wireless network client device; and
  storing the device configuration data from the wireless network client device, wherein the client device is allowed to subsequently join the wireless network without repeating the PBC process.

\* \* \* \* \*